United States Patent [19]

Showalter

[11] 4,063,466
[45] Dec. 20, 1977

[54] SELF-ENERGIZING ANTI-RATTLE DEVICE

[75] Inventor: Dan Joseph Showalter, Muncie, Ind.

[73] Assignee: Borg-Warner Corporation, Chicago, Ill.

[21] Appl. No.: 761,935

[22] Filed: Jan. 24, 1977

Related U.S. Application Data

[63] Continuation-in-part of Ser. No. 643,731, Dec. 22, 1975, abandoned.

[51] Int. Cl.² .................... F16F 15/12; F16D 49/02
[52] U.S. Cl. ............................. 74/574; 74/331; 188/1 B; 188/83
[58] Field of Search ............. 74/331, 574; 64/15 C, 64/30 E, 1 V; 188/1 B, 83; 192/56 C

[56] References Cited

U.S. PATENT DOCUMENTS

| | | | |
|---|---|---|---|
| 1,107,731 | 8/1914 | Vold | 74/574 |
| 1,796,992 | 3/1931 | Helm et al. | 74/409 |
| 1,985,296 | 12/1934 | Meyer | 74/574 |
| 2,034,150 | 3/1936 | Nardone | 74/336 |
| 2,181,541 | 11/1939 | Barkeij | 192/48 |
| 2,185,602 | 1/1940 | Metzler | 74/337 |
| 2,360,157 | 10/1944 | Olson | 74/574 |
| 2,931,464 | 4/1960 | Zwick | 74/574 X |
| 3,093,007 | 6/1963 | Aebersold | 74/325 |
| 3,373,625 | 3/1968 | Keller | 74/409 |
| 3,916,718 | 11/1975 | Kelbel et al. | 74/473 R X |

*Primary Examiner*—Allan D. Herrmann
*Attorney, Agent, or Firm*—Julian Schachner

[57] ABSTRACT

Self-energizing anti-rattle apparatus particularly adapted for eliminating gear rattle encountered in modern manual transmissions is characterized by the provision of a device which is activated for imposing a drag on the first ratio output gear when the transmission either is in neutral with the clutch engaged or is in reverse. The device includes a lost motion mechanism to prevent imposition of the drag while the first ratio output gear is being engaged, thereby eliminating any tendency to bind during engagement.

6 Claims, 3 Drawing Figures

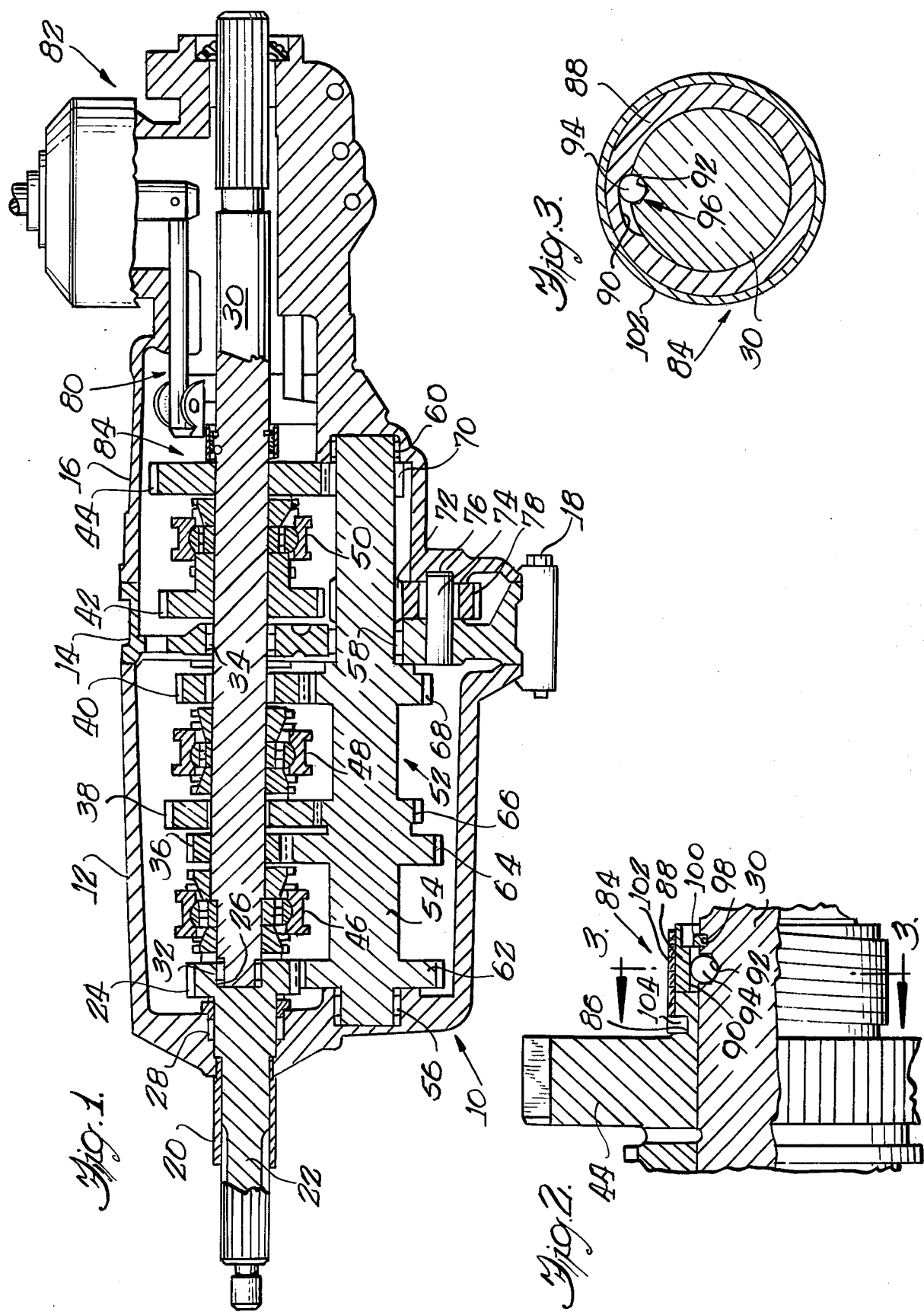

SELF-ENERGIZING ANTI-RATTLE DEVICE

CROSS REFERENCE TO RELATED APPLICATION

This application is a continuation-in-part of U.S. application Ser. No. 643,731 filed Dec. 22, 1975 and now abandoned.

BACKGROUND OF THE INVENTION

In recent years, there has been a tendency for automotive vehicles to become lighter and smaller and, as a result, to incorporate smaller engines than heretofore. With a small engine operating at low speeds, particularly when idling, pulsating firing impulses produce alternating angular accelerations and decelerations at the input of an assoicated transmission. This induces objectionable gear rattle, which is particularly objectionable in the small manual transmissions incorporated in modern vehicles.

U.S. application Ser. No. 643,731 discloses an anti-rattle device which is self-actuating to become operable when the variations in angular velocity are most objectionable; that is, when the engine is idling, the transmission is in neutral, and the clutch is engaged. That device is similar to a limited capacity spring clutch, but differs therefrom in that it is attached to the first ratio output gear and wrapped around the mainshaft. The spring thus rotates with the first ratio output gear. Relative rotation between the first ratio output gear and the mainshaft is such that there is a tendency for the spring to unwrap when the transmission is engaged in any forward ratio other than first. When the transmission is in first, the first ratio output gear is locked to the mainshaft. There is no relative rotation therebetween, and no tendency for the spring either to wrap or unwrap. When the transmission is in neutral with the clutch engaged, relative rotation between the first ratio output gear and the mainshaft is such that the spring tends to wrap tighter around the mainshaft. The resulting increased friction develops a drag that tends to reduce gear rattle which otherwise would be objectionable in the neutral idle condition. The increased friction also is developed when in reverse, but the resulting inefficiency is tolerable because of the relatively short periods of time when a transmission is engaged in reverse.

It is apparent now that the device may cause a binding condition during engagement of the first ratio output gear. To engage, a synchronizing clutch sleeve is moved, and it applies a load to a blocker ring, which load is transferred to the gear. When the clutch sleeve and the gear are turning at the same angular velocity, the clutch sleeve passes through the blocker ring plane and into engagement with the gear clutching teeth.

Due to random chance, the blocker ring and gear clutching teeth may be in alignment, in which case the clutch sleeve passes through the plane of the gear clutching teeth without contact. However, they may be out of alignment slightly, in which case the clutch sleeve contacts one side or the other of the gear clutching teeth as it passes through. Such contact could cause the gear overrun the mainshaft momentarily. This would activate the anti-rattle device and cause an undesirable binding condition.

SUMMARY OF THE INVENTION

This invention is directed to an anti-rattle device which solves the problem noted above. Briefly, the device includes a spring which tends to apply frictional drag on the first ratio output gear when the transmission is in neutral with the clutch engaged. The device also includes a lost motion mechanism to delay the frictional drag momentarily so as to prevent the undesirable binding condition which otherwise could be encountered while the gear is being engaged.

Thus, this invention meets the continuing need and desire in the art for improvements in the transmission of torque, and particularly for the elimination of gear rattle in a manual transmission, by providing a self-energizing anti-rattle device which is not effective when the transmission is engaged in any forward gear, which becomes effective to eliminate objectionable gear rattle in the neutral idle condition, and which prevents undesirable binding.

BRIEF DESCRIPTION OF THE DRAWING

The objects and and advantages of this invention become apparent to those skilled in the art upon careful consideration of the specification herein, including the drawing, wherein:

FIG. 1 is a sectional view showing a modern manual transmission incorporating the self-energizing anti-rattle apparatus;

FIG. 2 is an enlarged view of a portion of FIG. 1 showing details of the anti-rattle apparatus; and FIG. 3 is a sectional view taken along the line 3—3 of FIG. 2 showing additional details of the apparatus.

While this invention is susceptible of embodiment in many different forms, there is shown in the drawing and herein will be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

There is shown in the drawings a sliding gear, fully synchronized multi-speed and reverse transmission 10. Details of the transmission are disclosed in U.S. Pat. No. 3,916,712 issued Nov. 4, 1975. Briefly, transmission 10 includes a case 12, a center support 14, and an extension housing 16. These sections are suitably secured together by a plurality of bolts 18 to form a complete housing. Case 12 supports a sleeve 20. An input shaft 22 extends through sleeve 20 into transmission 10 and defines therein an input gear 24 and a bore 26. Input shaft 22 is journalled in a bearing 28 secured in the forward wall of case 12. A suitable seal is provided between case 12 and input shaft 22.

A mainshaft 30 is journalled in a pair of bearings 32 and 34, respectively secured in bore 26 of input shaft 22 and in center support 14. Mainshaft 30 extends through extension housing 16, and a suitable seal is provided therefor. A plurality of spaced output gears 36, 38, 40, 42 and 44 are journalled on mainshaft 30.

A fourth-fifth ratio synchronizing clutch mechanism 46 is located between input gear 24 and fifth ratio output gear 36. A second-third ratio synchronizing clutch mechanism 48 is located between second ratio output gear 38 and third ratio output gear 40. Similarly, a reverse-first ratio synchronizing clutch mechanism 50 is located between reverse ratio output gear 42 and first ratio output gear 44. Synchronizing clutch mechanisms 46, 48 and 50 may be of the type disclosed in U.S. Pat. No. 2,221,900 issued Nov. 19, 1940.

Clutch mechanism 46 is moved forwardly (leftwardly) to provide fourth or direct ratio, directly engaging input shaft 22 with mainshaft 30, and is moved rearwardly (rightwardly) to engage output gear 36 in fifth or overdrive ratio. Clutch mechanism 48 is moved forwardly to engage output gear 38 in second ratio, and is moved rearwardly to engage output gear 40 in third ratio. Similarly, clutch mechanism 50 is moved forwardly to engage output gear 42 in reverse ratio, and is moved rearwardly to engage output gear 44 in first ratio. Details of the shift structure for moving the clutch mechanisms are disclosed in U.S. Pat. No. 3,929,029 issued Dec. 30. 1975.

A cluster gear 52 includes a live countershaft 54 journalled in bearings 56, 58, and 60, respectively secured in case 12, center support 14, and extension housing 16. Details of the countershaft and the means by which the three bearings supporting it are maintained in proper alignment are disclosed in U.S. Pat. No. 4,041,791 issued Aug. 16, 1977.

Cluster gear 52 also includes a drive gear 62 meshing with input gear 24 to provide drive for countershaft 54, a fifth ratio input gear 64, a second ratio input gear 66, a third ratio input gear 68, and a first ratio input gear 70. These input gears mesh with fifth ratio output gear 36, second ratio output gear 38, third ratio output gear 40, and first ratio output gear 44 respectively. Cluster gear 52 further includes a reverse ratio input gear 72.

A reverse idler shaft 74 is secured in center support 14. Extension housing 16 defines a bore 76 in which shaft 74 is supported. A reverse idler gear 78 is journalled on shaft 74.

The improved transmission provides a convenient shift pattern which includes a leftward reverse-first position, a central second-third position and a rightward fourth-fifth position, as viewed from above. To achieve this pattern it is necessary to arrange the various gearsets as shown herein, and to provide that clutch mechanism 46 move forwardly to establish fourth ratio and rearwardly to establish fifth ratio, that clutch mechanism 48 move forwardly to establish second ratio and rearwardly to establish third ratio, and the clutch mechanism 50 move forwardly to establish reverse ratio and rearwardly to establish first ratio. Suitable linkage 80 for effecting this pattern is disclosed in detail in the aforementioned U.S. Pat. No. 3,916,712. Suitable shift control apparatus 82 for use in conjunction with linkage 80 is disclosed in detail in U.S. Pat. No. 3,916,718 issued Nov. 4, 1975.

The self-energizing anti-rattle apparatus 84 is associated with mainshaft 30 and first ratio output gear 44. Gear 44 defines a notch 86 adjacent mainshaft 30. An annular sleeve 88 is carried on mainshaft 60 and defines an elongated slot 90. A notch 92 is defined by mainshaft 30 opposite slot 90. A ball 94 is carried in notch 92 and slot 90 to establish a lost motion connection 96 between sleeve 88 and mainshaft 30. Lost motion connection 96 allows slight relative rotation between sleeve 88 and mainshaft 30, after which they rotate together.

Mainshaft 30 further defines a groove 98 in which a lock ring 100 is carried. Thus, sleeve 88 is held between gear 44 and lock ring 100 such that it takes axial thrust from gear 44, thereby acting in effect as a thrust washer.

A wire spring 102 defines an end 104 secured in slot 86 of gear 44 such that as gear 44 rotates, wire spring 102 is rotated therewith. Wire spring 102 is wrapped around a portion of gear 44 and sleeve 88, with its other end floating.

When transmission 10 is in any forward driving range other than first, first ratio output gear 44 rotates slower than mainshaft 30. Wire spring 102 rotates with gear 44, but is wound in such a manner that it tends to unwrap. As a result, friction developed between wire spring 102 and sleeve 88 is very low, and the resultant drag effect on gear 44 is negligible.

When transmission 10 is in first, first ratio output gear 44 is in driving engagement with mainshaft 30. Gear 44, wire spring 102, sleeve 88 and mainshaft 30 rotate in synchronization, and there is no friction developed between wire spring 102 and sleeve 88. As a result, there is no drag effect on gear 44.

When transmission 10 is in neutral with the clutch engaged, first ratio gear 44 is turning while mainshaft 30 is stationary. Relatively, gear 44 is rotating faster than mainshaft 30. Wire spring 102 rotates with gear 44 and tends to wrap tighter around sleeve 88, which is stationary along with mainshaft 30. As a result, friction between wire spring 102 and sleeve 88 is increased greatly. The resultant drag effect on gear 44 is increased greatly, thereby increasing the torque loading on gear 44 and preventing rattle caused by accelerations and decelerations of the engine flywheel. It has been found that frictional drag developed in neutral is on the order of 10 times that developed in forward gear ratios other than first.

When the transmission is in reverse, first ratio output gear 44 is rotating relatively faster than mainshaft 30 in a direction such that wire spring 102 tends to wrap tighter around sleeve 88. This results in undesirable friction between wire spring 102 and sleeve 88. However, as the percentage of driving time in reverse in an automotive application is low, the inefficiency of this condition is tolerable.

When transmission 10 is being shifted into first, synchronizing clutch mechanism 50 is moved rearwardly to engage first ratio output gear 44 with mainshaft 30. During engagement, clutch mechanism 50 could cause gear 44 to overrun mainshaft 30 momentarily. Lost motion connection 96 allows such momentary overrun before wire spring 102 begins to wrap tighter around sleeve 88. Thus, any binding during engagement effectively is prevented.

In order to determine the particular wire shape, size, material, number of wraps, etc., it is necessary to consider the specific application and the various torques required, as well as the operating coefficient of friction variance. The working stress levels are important due to the exponential nature of the torque change with variance in the coefficient of friction. Design parameters are discussed in an article entitled "Design Equations and Nomographs for Self-Energizing of Spring Clutches" by Kaplan and Marshall in the Apr. 19, 1956 issue of *Machine Design* magazine.

Neutral rattle typically worsens as temperatures increase. This device applies increasing torque as temperatures increase. The device also has the advantage of assisting low gear synchronization to a slight degree. It has the important quality of self-energizing only when required, with the exception of the relatively insignificant amount of time when operation is in reverse. It shortens reverse gear spin down time when the clutch is released prior to shifting into reverse, which allows faster engagement if reverse is not synchronized.

It should be apparent that although the invention provides for a self-energizing anti-rattle apparatus incorporated in a five-speed manual transmission, the apparatus is readily usable with other transmission assemblies or in other torque transmitting environments. Further, it should be understood that while a preferred embodiment of the invention has been shown and described, this should be considered as illustrative and may be modified by those skilled in the art without dpearting from the scope thereof, which is to be limited only by the claims herein.

I claim:

1. In combination, a rotatable shaft, first and second rotatable gears, said gears being engageable selectively with said shaft for rotation therewith in one direction of rotation respectively at a first relatively slow speed and a second relatively high speed, a wire spring engaged with said first gear for rotation therewith, and a sleeve supported on said shaft by a lost motion connection allowing slight relative rotation therebetween, said wire spring being coiled around said sleeve for establishing frictional engagement therewith, said wire spring being coiled so as to loosen in response to engagement of said second gear with said shaft, thereby decreasing said frictional engagement.

2. In a transmission, a rotatable input element, a rotatable output member, gear means having a neutral condition in which no torque is transmitted between said input element and output member and a drive condition in which torque is transmitted between said input element and output member selectively in a plurality of gear ratios, said gear means including a rotatable gear member engageable with said output member for establishing a low gear ratio, and anti-rattle means establishing frictional engagement between said members through a lost motion connection, rotation of said gear member relatively faster than said output member in said neutral condition tending to increase said frictional engagement, and rotation of said gear member relatively slower than said output member in a gear ratio other than low tending to decrease said frictional engagement.

3. In a transmission, a rotatable input shaft, a rotatable output shaft, gear means having a neutral condition in which no drive is transmitted between said shafts and a drive condition in which drive is transmitted between said shafts selectively in a plurality of forward gear ratios and a reverse gear ratio, said gear means including a rotatable gear engageable with one of said shafts in a first forward gear ratio, and anti-rattle means rotatable in response to rotation of said gear and in frictional engagement with said one shaft through a lost motion connection, relative rotation between said gear and said one shaft in one direction tending to increase said frictional engagement after a predetermined relative rotation determined by said lost motion connection, and relative rotation between said gear and said one shaft in another direction tending to decrease said frictional engagement.

4. The invention of claim 3, said anti-rattle means including a sleeve supported on said one shaft by said lost motion connection, and a wire spring wrapped around said sleeve for establishing said frictional engagement, rotation of said gear relatively faster than said one shaft in said one direction tending to wrap said wire spring after said predetermined relative rotation, thereby tending to increase said frictional engagement, and rotation of said gear relatively slower than said one shaft in said one direction tending to unwrap said wire spring, thereby tending to decrease said frictional engagement.

5. The invention of claim 4, said wire spring being wrapped around said sleeve and a portion of said gear.

6. The invention of claim 4, said lost motion connection including a notch defined by said one shaft, a ball supported in said notch, and an elongated slot defined by said sleeve and into which said ball projects.

* * * * *

UNITED STATES PATENT OFFICE
CERTIFICATE OF CORRECTION

PATENT NO. : 4,063,466
DATED : December 20, 1977
INVENTOR(S) : DAN J. SHOWALTER

It is certified that error appears in the above-identified patent and that said Letters Patent are hereby corrected as shown below:

Column 1, line 62 after "gear" insert -- to --.

Column 3, line 53, cancel "60" and insert -- 30 --.

Column 5, line 7, cancel -- dpearting -- and insert -- departing --.

Signed and Sealed this

Eighteenth Day of April 1978

[SEAL]

Attest:

RUTH C. MASON
Attesting Officer

LUTRELLE F. PARKER
Acting Commissioner of Patents and Trademarks